A. L. DARBY.
Mowing Machine.
No. 33,296. Patented Sept. 17, 1861.
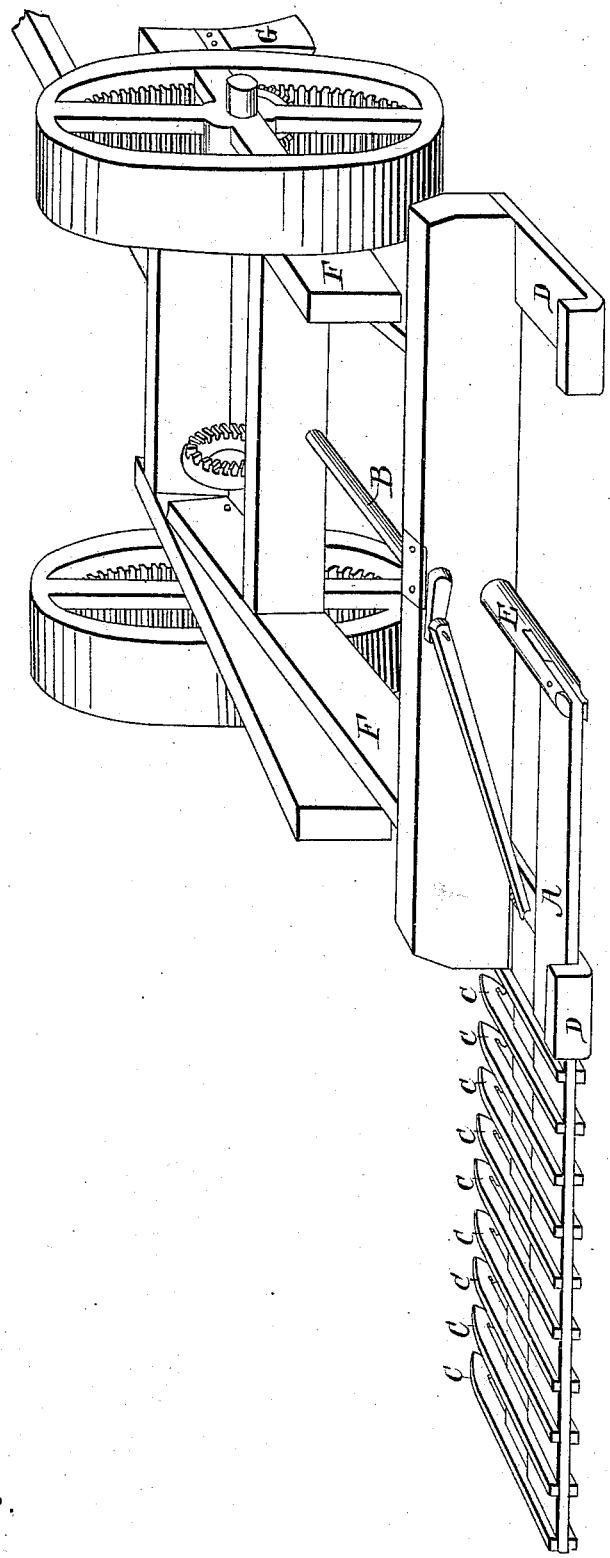

UNITED STATES PATENT OFFICE.

ASA L. DARBY, OF WHITE CREEK, NEW YORK.

IMPROVEMENT IN MOWING-MACHINES.

Specification forming part of Letters Patent No. 33,296, dated September 17, 1861.

*To all whom it may concern:*

Be it known that I, ASA L. DARBY, of White Creek, in the county of Washington and State of New York, have invented new and useful Improvements in Mowing-Machines; and I do hereby declare that the following is a full, clear, and exact description of the construction and operation of the same, reference being had to the annexed drawing, making a part of this specification.

The drawing represents one of the forms of construction of mowing-machines with my improvements attached. It is a frame supported on a pair of wheels having a set of cogs within their inner periphery, which cogs drive a spur-wheel and axis concerted in the drawing by the framing. On this axis, within the framing, and partially shown, is a bevel driving-wheel operating another bevel-wheel fixed upon the forward end of the shaft B, which runs lengthwise through or near the center of the moving or librating frame F, the center of whose libration is at or near the axis of the spur-wheel referred to. The outer end of this shaft B carries the crank which operates the knives or cutters in the usual manner by a pitman or connecting rod.

The cutter-bar A, to which is affixed the fingers or cutter-guards C, is arranged to turn over, when required upon a shaft or axis, E, which is placed upon (or passes through) the front beam of the frame F below the shaft B, so as to allow the crank which drives the cutters with its connecting-rod to pass free of it. It is also fitted so as to pass in the rear of and clear of the outer end of the crank-pin. By reference to the drawing it will be seen that this arrangement will permit the cutter-bar A to be turned over from its position, as shown, to one in line with it on the opposite side of the frame that is to be turned over one hundred and eighty degrees of a circle, yet allow the cutters to operate as well as in their first position. In order to keep the cutters in place, the guards or fingers C are made alike in shape upon their upper and lower parts, the cutters working through a slot in each of them, so that their blades being similar in form upon their upper and lower edges cut equally well either side up. To hold the cutter-bar at its proper height for cutting and to allow a little play for inequalities of ground surface, projecting shelves or brackets of iron D, with ledges rising from their rear, are attached to the outer back ends of frame F. It will be manifest that the libration of frame F upon its axis in one direction and of the cutter-bar upon axis E in a direction at right angles thereto, will accommodate the range of the cutters to every irregularity of the field of operation. The crank and cutters will operate together equally well to effect this change of cutting from right to left if the crank work directly under instead of over the pivot of the cutter-bar. What is required is that the direction of the axis of the crank from the cutter-bar's axis be at right angles to the lowest ranges in which the bar is to be used when operating. The object of this arrangement is to allow the machine to be used by returning along the line of a swarth just cut instead of cutting continuously around a body of grass or grain, and for the convenience of side-hill mowing where the latter mode of cutting cannot be employed unless to great disadvantage. There are also other circumstances and conditions of the grass or grain which make it desirable to mow by cutting, returning along the last swarth.

What I claim as my invention, and desire to secure by Letters Patent, is—

The arrangement of the cutter-bar A in reference to the crank operating the cutters, so that the axis of the one may be in such position toward the other that the bar may be swung over from its working position on one side of the frame F to a similar position on the other and permit the crank to operate the cutters equally well on either side, substantially as set forth in the within specification.

Dated the 17th day of October, 1859.

ASA L. DARBY.

Witnesses:
 HERMAN K. SHARPE,
 H. N. GOODMAN.